US009001030B2

(12) United States Patent
Raffle et al.

(10) Patent No.: US 9,001,030 B2
(45) Date of Patent: Apr. 7, 2015

(54) HEADS UP DISPLAY

(75) Inventors: Hayes S. Raffle, Palo Alto, CA (US); Chia-Jean Wang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 453 days.

(21) Appl. No.: 13/397,459

(22) Filed: Feb. 15, 2012

(65) Prior Publication Data

US 2013/0207887 A1      Aug. 15, 2013

(51) Int. Cl.
*G06F 3/01* (2006.01)
*G02B 27/00* (2006.01)

(52) U.S. Cl.
CPC ............... *G02B 27/00* (2013.01); *G06F 3/013* (2013.01)

(58) Field of Classification Search
CPC ................................................ G02B 2027/0138
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,886,822 A * | 3/1999 | Spitzer | 359/630 |
| 5,896,232 A | 4/1999 | Budd et al. | |
| 6,222,677 B1 | 4/2001 | Budd et al. | |
| 6,690,516 B2 | 2/2004 | Aritake et al. | |
| 6,715,878 B1 | 4/2004 | Gobbi et al. | |
| 6,738,535 B2 | 5/2004 | Kanevsky et al. | |
| 6,747,611 B1 | 6/2004 | Budd et al. | |
| 6,880,931 B2 | 4/2005 | Moliton et al. | |
| 2004/0174496 A1 * | 9/2004 | Ji et al. | 351/209 |
| 2010/0157433 A1 | 6/2010 | Mukawa et al. | |
| 2010/0202048 A1 * | 8/2010 | Amitai et al. | 359/487 |
| 2011/0213664 A1 | 9/2011 | Osterhout et al. | |
| 2013/0021658 A1 * | 1/2013 | Miao et al. | 359/256 |
| 2013/0044130 A1 * | 2/2013 | Geisner et al. | 345/633 |
| 2013/0128364 A1 * | 5/2013 | Wheeler et al. | 359/630 |
| 2013/0162505 A1 * | 6/2013 | Crocco et al. | 345/7 |

FOREIGN PATENT DOCUMENTS

| | | |
|---|---|---|
| JP | 2003-230539 A | 8/2003 |
| WO | WO 2011/114092 A1 | 9/2011 |

OTHER PUBLICATIONS

PCT/US2013/021593; PCT International Search Report and Written Opinion of the International Searching Authority, mailed Apr. 30, 2013, 12 pages.
PCT/US2013/021593; PCT International Preliminary Report on Patentability, mailed Aug. 28, 2014, 11 pages.

* cited by examiner

*Primary Examiner* — Seokyun Moon
*Assistant Examiner* — Peijie Shen
(74) *Attorney, Agent, or Firm* — Blakely Sokoloff Taylor & Zafman LLP

(57) ABSTRACT

Embodiments of an apparatus comprising a light guide including a proximal end, a distal end, a display positioned near the proximal end, an eye-tracking camera positioned at or near the proximal end to image eye-tracking radiation, a proximal optical element positioned in the light guide near the proximal end and a distal optical element positioned in the light guide near the distal end. The proximal optical element is optically coupled to the display, the eye-tracking camera and the distal optical element and the distal optical element is optically coupled to the proximal optical element, the ambient input region and the input/output region. Other embodiments are disclosed and claimed.

37 Claims, 7 Drawing Sheets

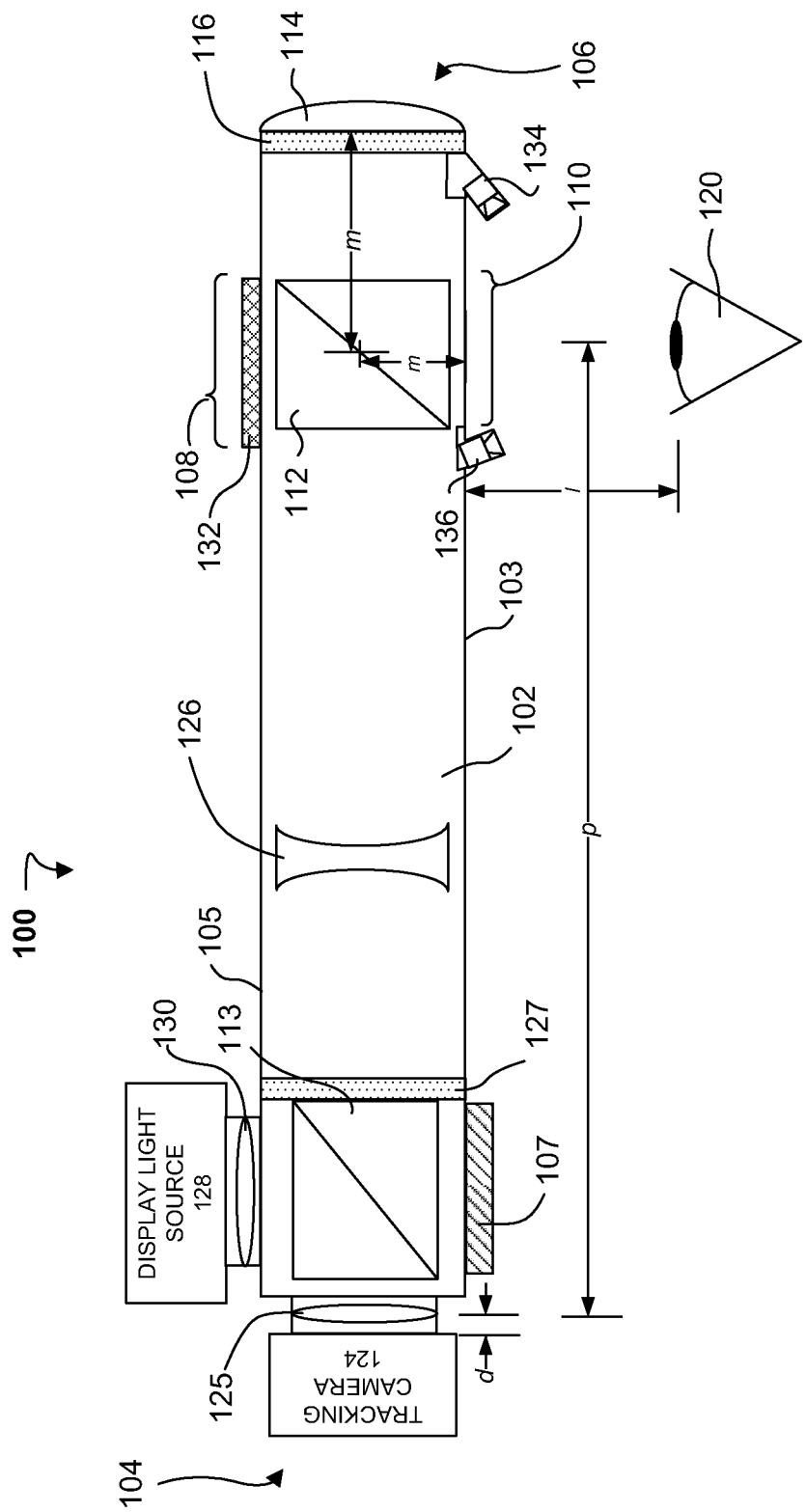

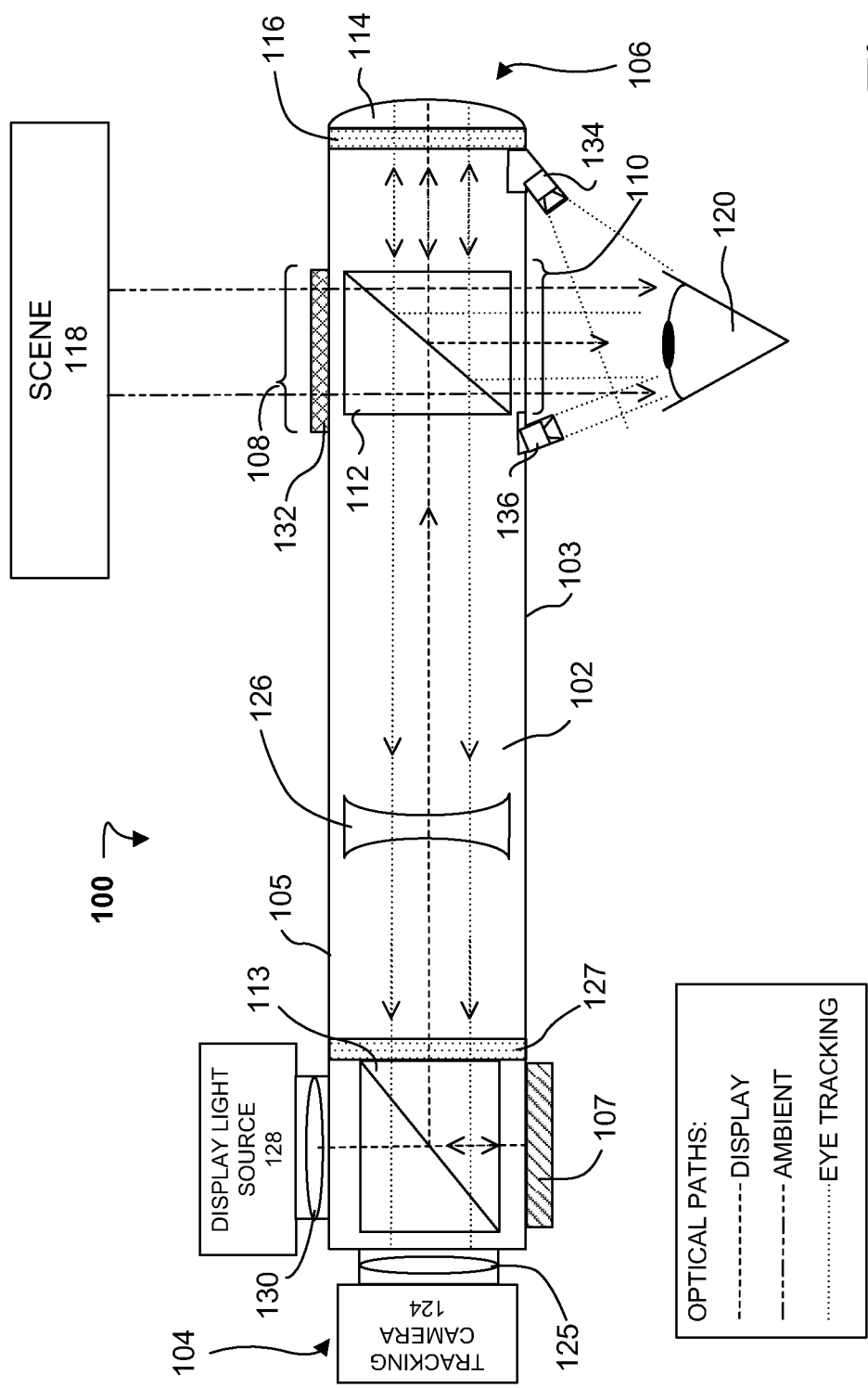

HEADS UP DISPLAY

TECHNICAL FIELD

The described embodiments relate generally to heads-up displays and in particular, but not exclusively, to heads-up displays including eye tracking.

BACKGROUND

Heads-up displays allow a user to view a scene while relevant information is overlaid on the scene, so that the user looking through the heads-up display simultaneously sees both the scene and the relevant information. For example, a pilot looking through a heads-up display while landing an airplane simultaneously sees the airport ahead (the scene) through the heads-up display while the heads-up display projects information such as speed, heading and altitude (the relevant information) that the pilot needs to land the plane.

In some uses of a heads-up display it can be useful know what part of the scene the user is viewing. One way to accomplish this is through eye-tracking technology, but existing eye-tracking technologies have some disadvantages. Among other things, existing eye tracking technologies use an optical path separate from the optical path used for the display, making the heads-up display more bulky and complex and less streamlined.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1A is a cross-sectional view of an embodiment of a heads-up display.

FIG. 1B is a cross-sectional view of the embodiment of the heads-up display of FIG. 1A illustrating its operation.

DETAILED DESCRIPTION OF THE ILLUSTRATED EMBODIMENTS

Figure 2:
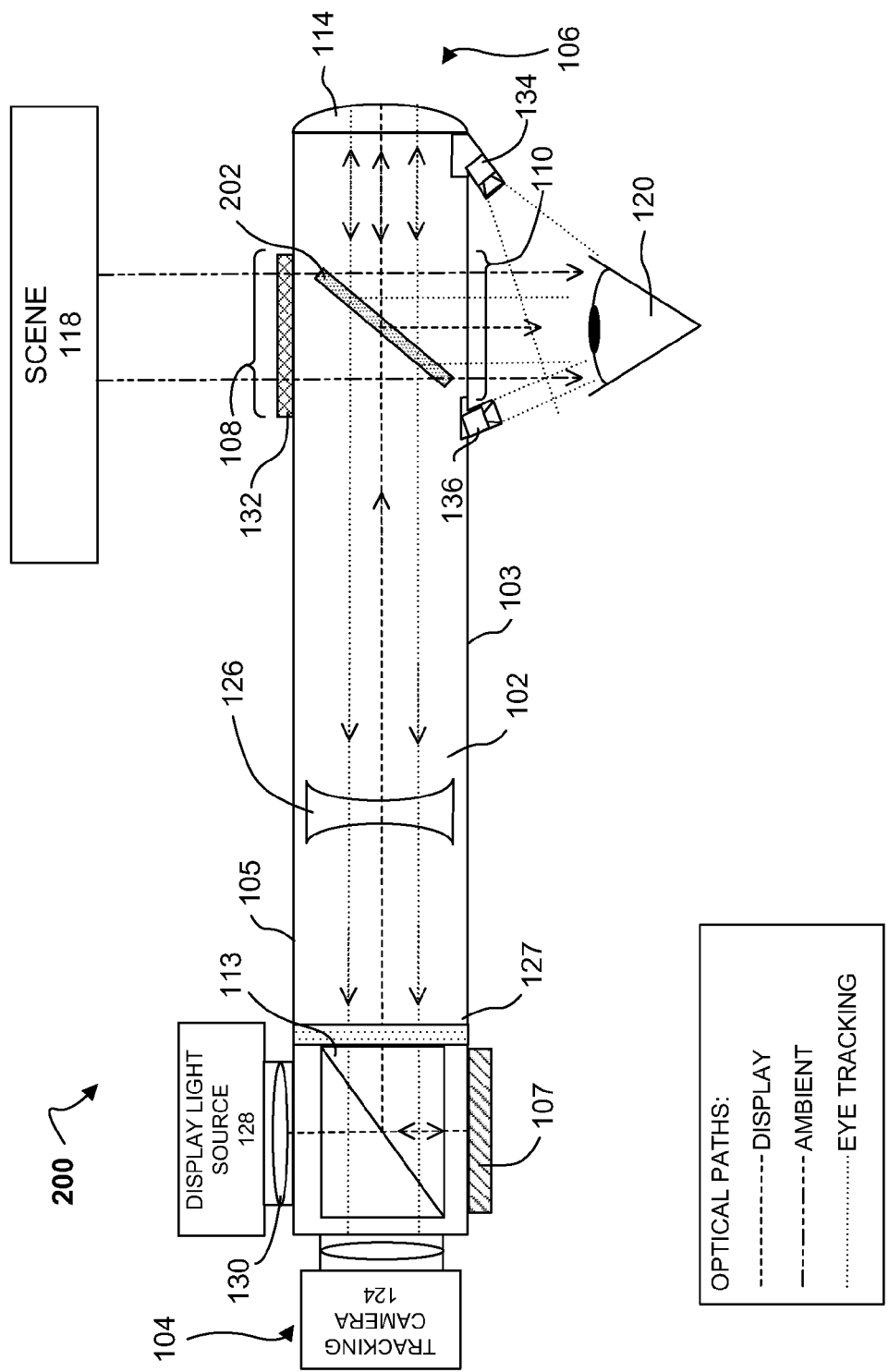
FIG. 2 is a cross-sectional view of another embodiment of a heads-up display.

Embodiments of an apparatus, system and method for a heads-up display including eye-tracking are described. Numerous specific details are described to provide a thorough understanding of embodiments of the invention, but one skilled in the relevant art will recognize that the invention can be practiced without one or more of the described details, or with other methods, components, materials, etc., that are not described. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances in this specification of the phrases "in one embodiment" or "in an embodiment" do not necessarily all refer to the same embodiment. Furthermore, the described features, structures, or characteristics may be combined in any suitable manner in one or more embodiments.

FIG. 1A illustrates an embodiment of a heads-up display 100. Display 100 includes a light guide 102 having a back surface 103, a front surface 105, a proximal end 104 and a distal end 106. Light guide 102 can be made of any kind of material that is substantially transparent in the wavelengths of interest; in one embodiment, for example, light guide 102 can be made of a plastic material such as polycarbonate or optical-grade acrylic, but in other embodiments it could be made of a different material such as glass. Near distal end 106 are an ambient input region 108 positioned on front surface 105 to receive ambient light from a scene 118 (see FIG. 1B) and an input/output region 110 positioned on back surface 103 to receive input eye-tracking radiation and output both display light and ambient light to an eye 120 of a user.

A display 107 is positioned on back surface 103 near proximal end 104. The display is optically coupled to light guide 102 so that display light from display 107 is input into light guide 102. In one embodiment display 107 is a liquid-crystal-on-silicon (LCOS) display, but in other embodiments other kinds of displays can be used. The embodiment in which display 107 is a reflective LCOS can be optically coupled to a display light source 128. In one embodiment, display light source 128 is an LED source that emits only light in the visible portion of the spectrum, such as white light or red, green and blue (RGB). In other embodiments light source 128 can be some other type of source and can emit in other wavelength ranges, provided the wavelength range of display light source 128 does not overlap with the wavelength of the eye-tracking radiation (see below). Display light source 128 can also include an optical element 130 to help condition the light, for example by collimating or focusing. As described below for FIG. 1B, light source 128 illuminates LCOS display 107 and LCOS display 107 modifies incident p-polarization to s-polarization as reflected by the silicon. The light reflected from LCOS 107 is referred to as the display light.

An eye-tracking camera 124 is coupled to light guide 102 at or near distal end 104 to receive and image eye-tracking radiation directed to it through light guide 102. The wavelength of the eye-tracking radiation can be within the visible range or outside the visible range. In one embodiment, the eye-tracking radiation can be infrared. In one embodiment eye-tracking camera 124 can be a camera including an image sensor such as a CMOS or CCD image sensor. In the illustrated embodiment, eye-tracking camera 124 is optically coupled to light guide 102 by an optical element 125. In one embodiment optical element 125 is a refractive lens, but in other embodiments it can be a reflective or diffractive optical element, or a combination of refractive, diffractive and reflective optical elements. In an embodiment in which optical element 125 is a refractive lens, its focal length $f_c$ can be computed according to the formula:

$$f_c = \left[ \frac{1}{\left(\frac{1}{f_m} - \frac{1}{l+m}\right)^{-1} + m + p} + \frac{1}{d} \right]^{-1}$$

where $f_m$ is the focal length of focusing mirror 114 (approximately R/2 for a mirror with radius R), l is the distance between eye 120 and light guide 102, m is the distance between back surface 103 and the center of polarizing beam splitter 112 plus the distance between the center of distal optical element 112 and the distal end of light guide 102, d is the distance between back surface 103 and the eye, and p is the distance from the proximal end of light guide 102 to the center of distal optical element 112. In other embodiments eye-tracking camera 124 can be directly coupled to light guide 102 without an intervening optical element such as optical element 125.

Positioned in light guide 102 at or near proximal end 104 is a proximal optical element 113 that is optically coupled to eye-tracking camera 124, display 107, and a distal optical element 112. Proximal optical element 113 operates to transmit light from display light source 128 to display 107, and from display 107 through light guide 102 toward distal end 106. Proximal optical element 113 also operates to direct light received through light guide 102 from distal end 106 toward eye-tracking camera 124 and, if present, optical element 125. In the illustrated embodiment proximal optical element 113 is a polarizing beam splitter (PBS), but in other embodiments optical element 113 can be some other element (see, e.g., FIGS. 2-3). Half-wave plate 127 is positioned next to proximal optical element 113 such that it is between proximal optical element 113 and distal optical element 112.

Distal optical element 112 is positioned at or near distal end 106 and is optically coupled to proximal optical element 113, ambient input region 108, and input/output region 110. Distal optical element 112 is also coupled to optical elements 114 and 116, which are positioned on the distal end of light guide 102. In the illustrated embodiment distal optical element 112 is a polarizing beamsplitter, optical element 114 is a focusing mirror 114, and optical element 116 is a quarter-wave plate sandwiched between optical element 114 and the distal end of light guide 102. In other embodiments optical elements 112, 114 and 116 can be other types of optical elements, provided that the individual elements and their combination accomplish the desired result. For example, in other embodiments of display 100 distal optical element 112 can be a 50/50 (50% pass, 50% reflect) non-polarizing beam splitter, in which case quarter-wave plate 116 can be omitted.

A filter 132 is positioned on front surface 105 so that it substantially covers ambient input region 108. Filter 132 is used to completely block or substantially reduce radiation from scene 118 having the same wavelength as the eye-tracking wavelength from entering light guide 102 so that it doesn't interfere with eye tracking. The wavelength or wavelength range is filtered out by filter 132 will depend on the wavelength used for eye-tracking, referred to herein as the eye-tracking wavelength. In an embodiment in which the wavelength used for eye-tracking is infrared, filter 132 can be a hot mirror or infrared filter, but in other embodiments filter 132 can be some other type of filter. In other embodiments, filters such as filter 132 could also be placed at other locations where ambient light could enter light guide 102, such as the top and bottom surfaces of the light guide.

A first eye-tracking radiation source 134 is positioned near distal end 106 to illuminate eye 120 so that it can be tracked by eye-tracking camera 124. Eye tracking radiation source 134 emits radiation at the eye-tracking wavelength and is positioned and oriented to direct eye-tracking radiation toward user's eye 120 at an angle such that eye-tracking radiation reflected from the user's eye will be directed toward input/output region 110. In one embodiment radiation source 134 is an infrared LED, so that the eye tracking light has a wavelength in the infrared range. In other embodiments, however, eye-tracking radiation source 134 can be a different radiation source emitting a different wavelength. Generally it may be desirable that eye-tracking radiation 134 emit a broad beam of radiation that substantially illuminates the eye 120.

A second eye-tracking radiation source 136 can also be positioned near distal end 106. Eye-tracking radiation source 136 is positioned and oriented so it can direct radiation at the eye-tracking wavelength toward user's eye 120 at an angle such that radiation reflected from the eye will be directed toward input/output region 110. In contrast to first eye-tracking radiation source 134, second eye-tracking radiation source 136 directs a more focused beam toward eye 120 to create an identifiable spot or glint on the eye that can then be used to track the eye using eye tracking methods that track the vector between the glint and the center of the pupil. In some embodiments, radiation source 136 can be omitted, for example in embodiments that do not use vector tracking methods to track the position of the eye.

FIG. 1B illustrates the operation of heads-up display 100. The operation described below is of an embodiment in which proximal optical element 113 is a polarizing beamsplitter that (i) passes p-polarization and reflects s-polarization for visible light and (ii) passes both s-polarization and p-polarization for the eye-tracking radiation wavelength. Distal optical element 112 is similarly a polarizing beam splitter that passes p-polarization and reflects s-polarization for both visible light wavelengths and the eye-tracking wavelength. Of course, in alternative embodiments the characteristics of beam splitters 112 and 113 can be selected differently.

Three optical paths can operate simultaneously in display 100: the display light path, the ambient light path, and the eye-tracking radiation path. The display light path begins at display light source 128, which generates visible p-polarized and infrared-free light. P-polarized light from light source 128 travels through polarizing beamsplitter 113 and strikes display 107. Display 107 reflects the incident light, changes it to s-polarization in active pixels to modulate an optical signal onto the light. The s-polarized display light is directed toward polarizing beam splitter 113, which reflects it such that the s-polarized display light encounters half-wave plate 127, which rotates the polarization of the display light so that it is p-polarized. The now p-polarized display light enters light guide 102 and travels through the light guide to polarizing beam splitter 112. As it travels through light guide 102, p-polarized display light encounters optical element 126, if present. Optical element 126 can apply optical power to the display light to either focus or collimate it. After passing through optical element 126, the display light continues to light guide 102 toward distal end 106, where it encounters polarizing beamsplitter 112.

When the p-polarized display light impinges on polarizing beamsplitter 112, the beamsplitter allows the p-polarized display light to travel directly through it. The p-polarized light that passes through beamsplitter 112 then travels through quarter-wave plate 116, which rotates the polarization by 45 degrees, and then encounters focusing mirror 114. Focusing mirror 114 reflects and/or focuses the polarized light, directing it back through quarter-wave plate 116. On its second trip through quarter-wave plate 116, the polarization of the display light is rotated by a further 45 degrees, so that before encountering polarizing beamsplitter 112 again the polarization of the display light has change to s-polarization. As a result of this change of polarization, when the now s-polarized display light encounters polarizing beamsplitter 112 a second time the beamsplitter reflects the display light toward input/output region 110 instead of allowing it to pass through. The s-polarized display light then exits the light guide 102 and enters the user's eye 120.

The second optical path is the ambient light path. Simultaneously with receiving light from display 107, light guide 102 can receive ambient light from scene 118 through ambient input region 108. Filter 132 covers some or all of ambient input region 108 and functions to reduce or eliminate radiation from the ambient light that is substantially of the same wavelength as the wavelength of the eye-tracking radiation, so that the ambient light will not interfere with the eye-tracking radiation. For example, in an embodiment where the eye-tracking radiation is infrared, filter 132 reduces or eliminates infrared from the ambient light. After filtering by filter 132, a substantial portion of the ambient light that enters through ambient input region 108 can travel straight through polarizing beamsplitter 112 and exit the light guide through output region 110 to user's eye 120.

The third optical path is the path of the eye-tracking radiation. Eye-tracking radiation source 134 and eye-tracking radiation source 136 (if present) direct s-polarized eye-tracking radiation toward user's eye 120. User's eye 120 reflects the s-polarized eye-tracking radiation and directs it into light guide 102 through input/output region 110. When the s-polarized eye-tracking radiation impinges on polarizing beamsplitter 112, the s-polarized radiation is reflected by the beamsplitter toward quarter-wave plate 116, which rotates the polarization by 45 degrees, and then encounters focusing mirror 114. Focusing mirror 114 reflects and/or focuses the polarized light, directing it back through quarter-wave plate 116. On its second trip through quarter-wave plate 116, the polarization of the eye-tracking radiation is rotated by a further 45 degrees, so that before encountering polarizing beamsplitter 112 again the polarization of the eye-tracking radiation has change to p-polarization. As a result of this change of polarization, when the now p-polarized display light encounters polarizing beamsplitter 112 a second time the beamsplitter allows the p-polarized display light to travel directly through it into light guide 102 and toward beamsplitter 113.

When the p-polarized display light encounters half-wave plate 127 it becomes s-polarized, but because beamsplitter 113 passes both p- and s-polarization in the eye-tracking wavelength, the s-polarized eye-tracking radiation travels straight through beamsplitter 113 to eye-tracking camera 124. Eye-tracking camera 124 can then use the received eye-tracking radiation to image user's eye 120 and track its movements. Optical elements 125 and 126, if present, can be used to adjust characteristics of the image received at eye-tracking camera 124, for example its field of view and/or its optical power.

FIG. 2 illustrates another embodiment of a heads-up display 200. Display 200 is similar in construction to display 100. The primary difference between displays 100 and 200 is that display 200 uses a partially-reflective mirror 202 for distal optical element 112; in other words, display 200 replaces polarizing beam splitter 112 of display 100 with partially-reflective mirror 202. In one embodiment partially-reflective mirror 302 is 50% reflective, meaning that is reflects 50% of the incident light and allows the other 50% of the incident light to pass through. In other embodiments, however, these percentages can be different.

The three optical paths in display 200 are similar to those in display 100, except that at partially-reflective mirror 202 there is no selective passing and reflection of the different optical paths based on polarization.

Figure 3:
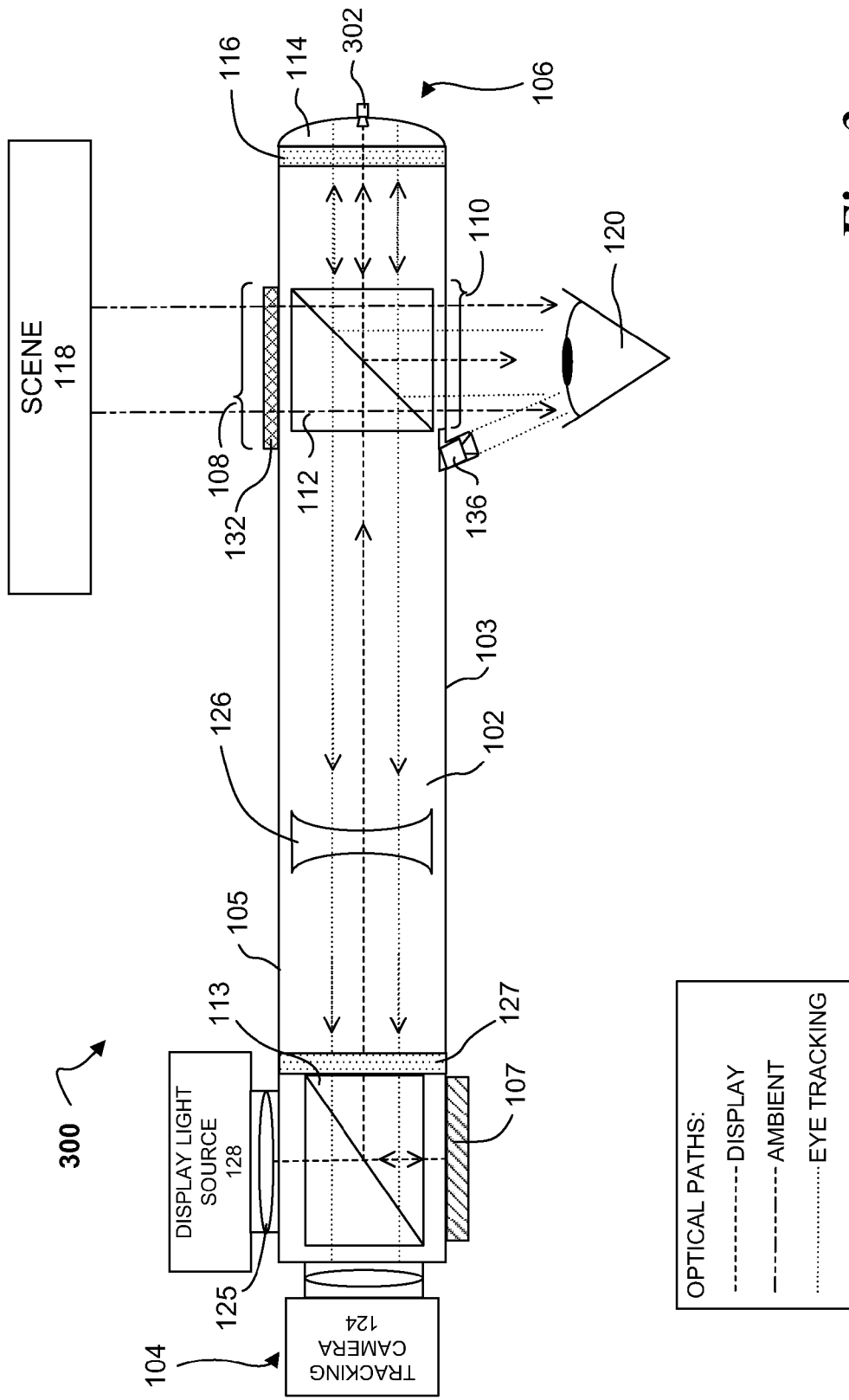
FIG. 3 is a cross-sectional view of yet another embodiment of a heads-up display.

FIG. 3 illustrates another embodiment of a heads-up display 300. Display 300 is similar in construction to display 100; the primary differences are that display 300 replaces eye-tracking radiation source 134 with eye-tracking radiation source 302 positioned in optical element 114 at the distal end 106 of the display, and that the different position of eye-tracking radiation source 302 can require a change in the operational characteristics of distal optical element 112. In display 100 distal optical element 112 can be a beamsplitter that passes p-polarization and reflects s-polarization for both visible light wavelengths and the eye-tracking wavelength. In one embodiment, eye-tracking radiation source 302 is a circularly polarized infrared source, but of course in other embodiments other types of radiation source are possible. As in display 100, second eye-tracking radiation source 136 is optional, meaning that it can be, but need not be, present in some embodiments.

Display 300 operates similarly to display 100. As with display 100, display 300 includes three simultaneous optical paths: the display light path, the ambient light path, and the eye-tracking radiation path. The display light path and the ambient light path in display 300 are substantially similar to the corresponding light paths in display 100, but the eye tracking radiation path is substantially different because of the different position of eye tracking radiation source 302. The operation of display 300 described below is of an embodiment in which proximal optical element 113 is a polarizing beamsplitter that (i) passes p-polarization and reflects s-polarization for visible light and (ii) passes both s-polarization and p-polarization for the eye-tracking radiation wavelength. Distal optical element 112 is similarly a polarizing beam splitter that reflects s-polarization and passes p-polarization for both visible light wavelengths and the eye-tracking wavelength. Of course, in alternative embodiments the characteristics of beam splitters 112 and 113 can be selected differently.

In the illustrated embodiment, eye-tracking radiation source 302 directs circularly polarized eye-tracking radiation toward beamsplitter 112. After passing through quarter wave plate 116, the eye-tracking radiation becomes s-polarized so that beam splitter 112 reflect is toward input/output region 110 so that it can illuminate the user's eye 120. User's eye 120 reflects the s-polarized eye-tracking radiation and directs it into light guide 102 through input/output region 110.

When the s-polarized eye-tracking radiation received through input/output region 110 impinges on polarizing beamsplitter 112, the s-polarized radiation is again reflected by the beamsplitter toward quarter-wave plate 116, which rotates the polarization by 45 degrees, and it then encounters focusing mirror 114. Focusing mirror 114 reflects and/or focuses the polarized light, directing it back through quarter-wave plate 116. On its second trip through quarter-wave plate 116, the polarization of the eye-tracking radiation is rotated by a further 45 degrees, so that before encountering polarizing beamsplitter 112 again the polarization of the eye-tracking radiation has changed to p-polarization. As a result of this change of polarization, when the now p-polarized display light encounters polarizing beamsplitter 112 the beamsplitter allows the p-polarized display light to travel directly through it into light guide 102 and toward beamsplitter 113.

When the p-polarized eye-tracking radiation encounters half-wave plate 127 it becomes s-polarized, but because beamsplitter 113 passes both p- and s-polarization in the eye-tracking wavelength, the s-polarized eye-tracking radiation travels straight through the beamsplitter to eye-tracking camera 124. Eye-tracking camera 124 can then use the received eye-tracking radiation to image user's eye 120 and track its movements. Optical elements 125 and 126, if present, can be used to adjust characteristics of the image received at eye-tracking camera 124, for example its field of view and/or its optical power.

Figure 4A:
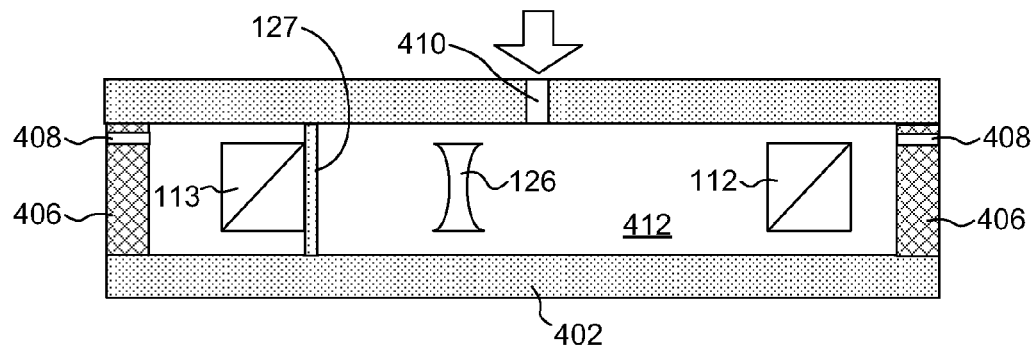
FIGS. 4A-4B are cross-sectional drawings of an embodiment of a process for making a heads-up display such as the one shown in FIGS. 1A-1B.
Figure 4B:
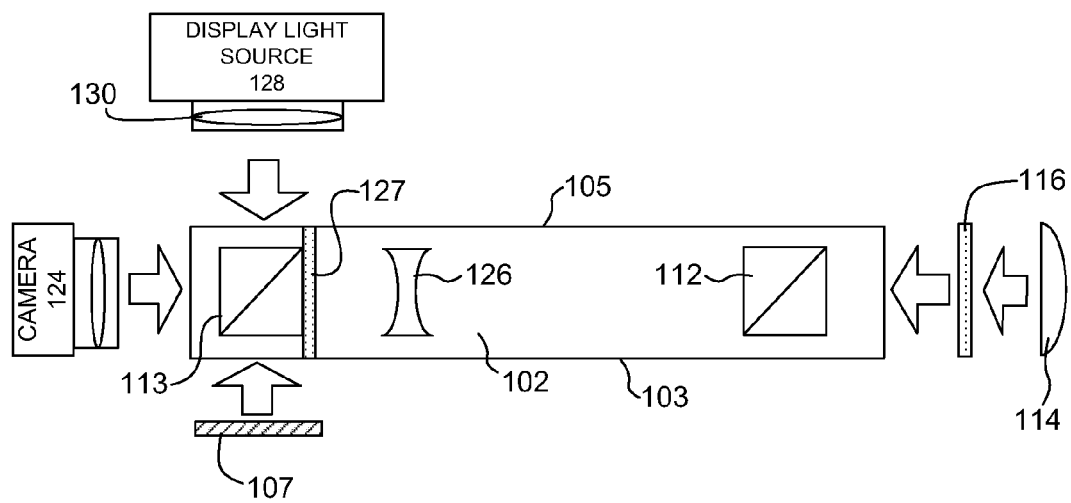

FIGS. 4A-4B illustrate an embodiment of a process for making heads-up display 100, but the illustrated process can also be used for making the other disclosed displays. FIG. 4A illustrates a first part of the process, in which a mold is formed using a lower plate 402 and an upper plate 404 separated by one or more spacers 406. The mold encloses a volume 412. Top plate 404 has a hole 410 therein to allow material to be injected into volume 412, while spacers 406 have vent holes 408 to allow gas to escape from volume 412 while material is injected through hole 410.

Optical elements that will be internal to the waveguide, such as half-wave plate 127, distal optical element 112 and proximal optical element 113, and additional optical element 126, if present, are properly positioned within volume 412 and fixed so that they do not move. A material is then injected through hole 410 into volume 412 so that it surrounds the internal optical elements, and the material is allowed to cure. When cured, the injected material will form light guide 102 and will hold the internal optical elements in place. Any material that has the required optical characteristics can be used; in one embodiment, for example, the material can be an optically transparent plastic such as polycarbonate or an optical-grade acrylic, but in other embodiments it can be a different material.

FIG. 4B illustrates a next part of the process. After the material is cured inside the mold the mold can be removed, leaving behind light guide 102. Elements of the display that go on the exterior of the light guide can then be added to complete the display. For example, eye-tracking camera 124 and optical element 125 (if present) can be attached to the proximal end of light guide 102; display light source 128 and optical element 130 (if present) can be attached to front side 105; display 107 can be attached to back side 103; and quarter-wave plate 116 and optical element 114 can be attached to the distal end of light guide 102. In one embodiment, all the components that go on the exterior of the light guide 102 can be attached using optically compatible adhesives that will hold these components in place while causing little or no optical distortion.

Figure 5:
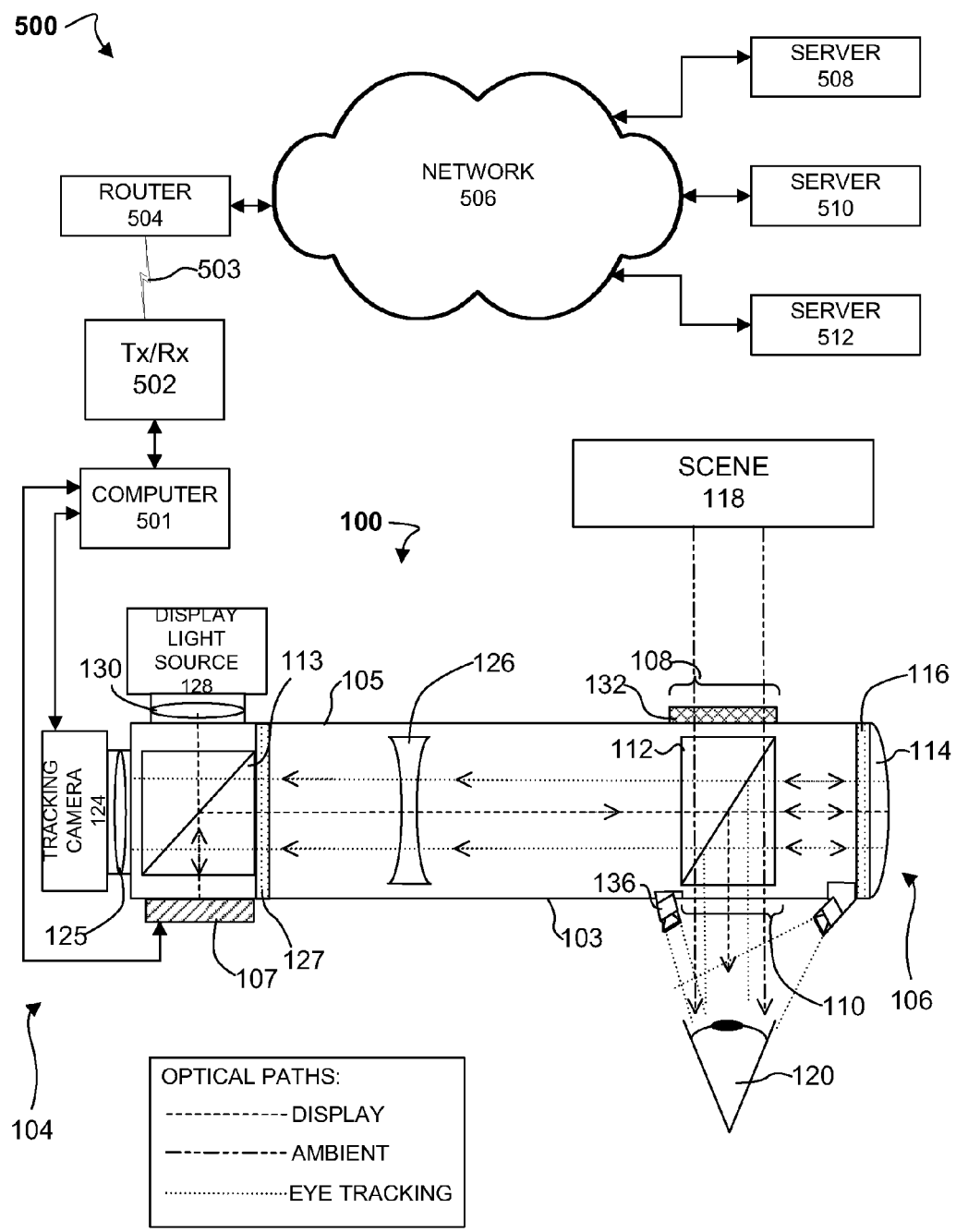
FIG. 5 is a block diagram of an embodiment of a system using a heads-up display such as the one shown in FIGS. 1A-1B.

FIG. 5 illustrates an embodiment of a system 500 including a heads-up display. System 500 employs display 100 as one of its components, but in other embodiments system 500 can employ any of the other disclosed displays. In some embodiments of system 500 the display, whether display 100 or one of the other disclosed displays, can include a secondary camera (not shown) positioned in, on or near the display to capture an image of scene 118. In system 500, eye-tracking camera 124 and display 107 are communicatively coupled via a computer 501 to a transceiver 502 that can both receive (Rx) and transmit (Tx) data. Computer 501 can include a general-purpose processor or an application-specific processor (ASIC), as well as memory, storage and any software or programming needed for its operation, such as an operating system, applications, databases and so forth. Computer 501 can also include additional hardware, such as a GPS unit that will provide the user's location.

Transceiver 502 is coupled to computer 501 as well as being coupled via a communication link 503 to a communication element such as a router 504; in the illustrated embodiment transceiver 502 and router 503 are coupled via a wireless link, but in other embodiments they could be coupled by other types of communication link such as electrical wire, optical fiber, free-space optics, etc. Router 504 is in turn coupled via a network 506 to one or more servers such as servers 508-512, but in other embodiments router 504 could be directly coupled to one or more servers without the need for an intervening network.

In operation of system 500, display 100 functions as previously described; user's eye 120 simultaneously sees ambient light from scene 118 and display light from display 107 while eye-tracking camera 124 simultaneously captures images of the user's eye 120. As the user sees ambient light from scene 118, camera 124 captures one or more images of user's eye 120 and transmits the images to computer 501. Computer 501 can then analyze the images and use the information to track the user's eye. In an embodiment with a secondary camera that captures an image of scene 118, computer 501 can use the eye tracking data and scene images to tell what part of scene 118 the user is focused on, and can use the additional data, such as the user's location established via GPS, for example, to provide information to the user about the part of the scene they are looking at.

In one embodiment of system 500, all processing can be done locally by computer 501, while in another embodiment some or all the image processing, data retrieval, etc., can be done remotely by servers 508-512. In yet another embodiment, the data processing can be done by some combination of computer 501 and servers 508-512. In an embodiment where all processing is done locally by computer 501, the computer need not have any access to external computers, so that all image analysis, data retrieval, etc. is done locally by computer 501. Such an embodiment could reduce latency and enhance system response by reducing the need for network communication with other components. Computer 501 can analyze images received from eye-tracking camera 124 to track the user's eye. In an embodiment with a secondary camera that captures images of scene 118, computer 501 can use the eye tracking data together with images of scene 118 to tell what part of the scene the user is focused on. Computer 501 can also use additional data, such as the user's location established via GPS, for example, to determine information about the part of the scene the user is looking at. Having determined relevant information about the scene, computer 501 can send the relevant information back to display 107. Display 107 then displays the relevant information about the object the user is viewing. Because display 100 is a heads-up display, the user's eye 120 sees the relevant information overlaid onto scene 118.

In an embodiment in which all processing is done remotely, or in an embodiment in which processing is done with a combination of local and remote processing, computer 501 can transmit all or parts of the image data to transceiver 502. Transceiver 502 in turn transmits the image data via communication link 503 to router 504, and the router in turn transmits the image data via network 506, if present, to one or more servers 508-512, which then can perform all the relevant image processing, data retrieval, etc.

Having processed the image data and determined any relevant information, servers 508-512 send the relevant information back through network 506, router 504 and transceiver 502 to computer 501 and display 107. Display 107 then displays the relevant information about the scene 118 to the user. Because display 100 is a heads-up display, the user's eye 120 sees the relevant information overlaid onto scene 118.

Figure 6:
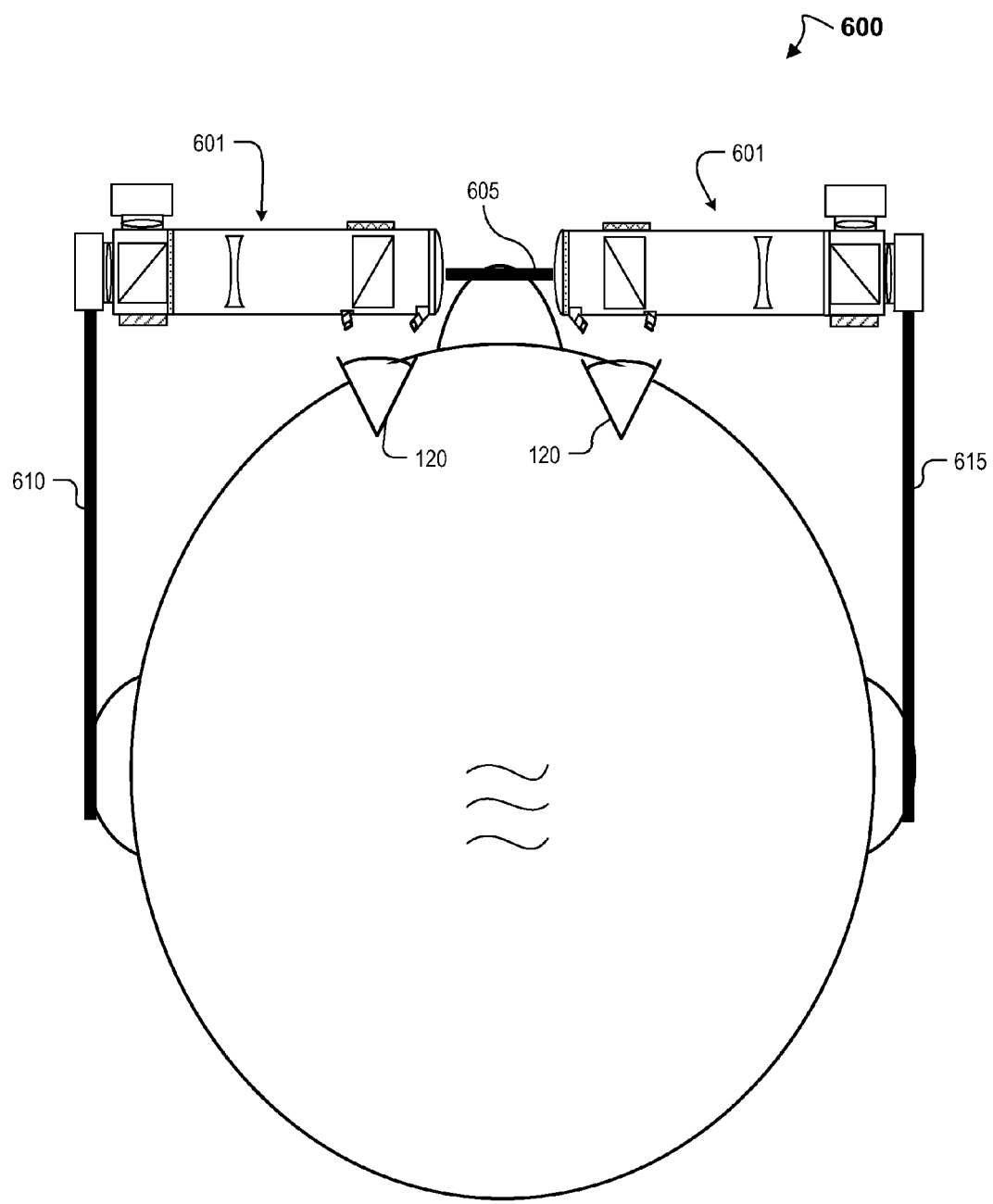
FIG. 6 is a top-view cross-sectional drawing of an embodiment of a heads-up display.

FIG. 6 illustrates an embodiment of a heads-up display 600 implemented as a pair of eyeglasses in which the eyeglass lens functions as the light guide. Heads-up display 600 includes a pair of eyepieces 601, each of which can be one of heads-up displays 100, 200 or 300, or can be all or part of a system such as system 500. Eyepieces 601 are mounted to a frame assembly, which includes a nose bridge 605, a left ear arm 610, and a right ear arm 615. Although the figure illustrates a binocular embodiment (two eyepieces), heads-up display 600 can also be implemented as a monocular (one eyepiece) embodiment.

Eyepieces 601 are secured into an eyeglass arrangement that can be worn on a user's head. Left and right ear arms 610 and 615 rest over the user's ears while nose assembly 605 rests over the user's nose. The frame assembly is shaped and sized to position the ambient input region 108 and input/output region 110 in front of a corresponding eye 120 of the user. Of course, other frame assemblies having other shapes may be used (e.g., a visor with ear arms and a nose bridge support, a single contiguous headset member, a headband, or goggles type eyewear, etc).

The above description of illustrated embodiments of the invention, including what is described in the abstract, is not intended to be exhaustive or to limit the invention to the precise forms described. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
   a light guide including a proximal end, a distal end, a front surface and a back surface spaced apart from the front surface, an ambient input region on the front surface near the distal end, and an input/output region on the back surface near the distal end;
   a display unit positioned near the proximal end;
   an eye-measurement camera positioned at or near the proximal end to image eye-measurement radiation;
   a proximal optical element positioned in the light guide near the proximal end and a distal optical element positioned in the light guide near the distal end,
   wherein the proximal optical element is optically coupled to the display unit, the eye-measurement camera and the distal optical element such that it directs display light to the distal optical element and directs eye-measurement radiation received from the distal optical element to the eye-measurement camera,
   wherein the distal optical element is optically coupled to the proximal optical element, the ambient input region and the input/output region such that it directs display light to the input/output region and directs eye-measurement radiation from the input/output region to the proximal optical element, and
   wherein the proximal optical element and the distal optical elements are polarizing beamsplitters.

2. The apparatus of claim 1 wherein the display unit comprises:
   a display light source positioned on the front surface; and
   a display positioned on the back surface.

3. The apparatus of claim 1, further comprising:
   a focusing element positioned at the distal end of the light guide; and
   a quarter-wave plate positioned between the focusing element and the distal end of the light guide.

4. The apparatus of claim 1, further comprising a half-wave plate positioned between the proximal optical element and the distal optical element.

5. The apparatus of claim 1 wherein the eye-measurement camera is mounted to the proximal end of the light guide.

6. The apparatus of claim 5, further comprising an optical element that optically couples the eye-measurement camera to the proximal end of the light guide.

7. The apparatus of claim 1, further comprising one or more sources of eye-measurement radiation positioned at or near the distal end.

8. The apparatus of claim 7 wherein the one or more sources of eye-measurement radiation include:
   a first eye-measurement radiation source positioned and oriented to illuminate a user's eye with eye-measurement radiation; and
   a second eye-measurement radiation source positioned and oriented to create a glint in the user's eye.

9. The apparatus of claim 1 wherein the eye-measurement radiation is of a non-visible wavelength.

10. The apparatus of claim 9 wherein the eye-measurement radiation is infrared.

11. The apparatus of claim 1, further comprising a filter positioned over at least a part of the ambient input region.

12. The apparatus of claim 1, further comprising one or more additional optical elements positioned in the light guide between the proximal optical element and the distal optical element.

13. A process comprising:
    generating eye-measurement information via a heads-up display comprising:
      a light guide including a proximal end, a distal end, a front surface, a back surface spaced apart from the front surface, an ambient input region on the front surface near the distal end, and an input/output region on the back surface near the distal end;
      a display unit positioned near the proximal end;
      an eye-measurement camera positioned at or near the proximal end to image eye-measurement radiation;
      a proximal optical element positioned in the light guide near the proximal end and a distal optical element positioned in the light guide near the distal end,
      wherein the proximal optical element is optically coupled to the display, the eye-measurement camera and the distal optical element such that it directs display radiation to the distal optical element and directs eye-measurement radiation received from the distal optical element to the eye-measurement camera,
      wherein the distal optical element is optically coupled to the proximal optical element, the ambient input region and the input/output region such that it directs display light to the input/output region and directs eye-measurement radiation from the input/output region to the proximal optical element, and
      wherein the proximal optical element and the distal optical elements are polarizing beam splitters; and
    simultaneously directing display light from a display into the light guide, directing ambient light from the ambient input region to the input/output region, and directing eye-measurement radiation from the input/output region to the eye-measurement camera.

14. The process of claim 13, further comprising imaging at least a portion of a user's eye with the eye-measurement camera.

15. The process of claim 13 wherein the heads-up display further comprises:
    a focusing element positioned at the distal end of the light guide; and
    a quarter-wave plate positioned between the focusing element and the distal end of the light guide.

16. The process of claim 13 wherein the heads-up display further comprises a half-wave plate between the proximal optical element and the distal optical element.

17. The process of claim 13, further comprising illuminating the user's eye using one or more sources of eye-measurement radiation positioned at or near the distal end.

18. The process of claim 17 wherein illuminating the user's eye using one or more sources of eye-measurement radiation includes:
   illuminating the user's eye using a first eye-measurement radiation source positioned and oriented to flood a user's eye with eye-measurement radiation; and
   illuminating the user's eye using a second eye-measurement radiation source positioned and oriented to create a glint in the user's eye.

19. The process of claim 13 wherein the eye-measurement radiation is of a non-visible wavelength.

20. The process of claim 19 wherein the eye-measurement radiation is infrared.

21. The process of claim 13, further comprising filtering the eye-measurement radiation from the ambient light received through the ambient input region.

22. A system comprising:
   one or more heads-up displays, each display comprising:
      a light guide including a proximal end, a distal end, a front surface, a back surface spaced apart from the front surface, an ambient input region on the front surface near the distal end, and an input/output region on the back surface near the distal end;
      a display unit positioned near the proximal end;
      an eye-measurement camera positioned at or near the proximal end to image eye-measurement radiation;
      a proximal optical element positioned in the light guide near the proximal end and a distal optical element positioned in the light guide near the distal end,
      wherein the proximal optical element is optically coupled to the display, the eye-measurement camera and the distal optical element such that it directs display light to the distal optical element and directs eye-measurement radiation received from the distal optical element to the eye-measurement camera,
      wherein the distal optical element is optically coupled to the proximal optical element, the ambient input region and the input/output region such that it directs display light to the input/output region and directs eye-measurement radiation from the input/output region to the proximal optical element, and
      wherein the proximal optical element and the distal optical elements are polarizing beam splitters; and
   a computer coupled to the eye-measurement camera and the display.

23. The system of claim 22 wherein the display unit comprises:
   a display light source positioned on the front surface; and
   a display positioned on the back surface.

24. The system of claim 22, further comprising:
   a focusing element positioned at the distal end of the light guide; and
   a quarter-wave plate positioned between the focusing element and the distal end of the light guide.

25. The system of claim 22, further comprising a half-wave plate between the proximal optical element and the distal optical element.

26. The system of claim 22 wherein the eye-measurement camera is mounted to the proximal end of the light guide.

27. The system of claim 26, further comprising an optical element that optically couples the eye-measurement camera to the proximal end of the light guide.

28. The system of claim 22, further comprising one or more sources of eye-measurement radiation positioned near the distal end.

29. The system of claim 28 wherein the one or more sources of eye-measurement radiation includes:
   a first eye-measurement radiation source oriented to flood a user's eye with eye-measurement radiation; and
   a second eye-measurement radiation source oriented to create a glint in the user's eye.

30. The system of claim 22 wherein the eye-measurement radiation is of a non-visible wavelength.

31. The system of claim 30 wherein the eye-measurement radiation is infrared.

32. The system of claim 22, further comprising a filter positioned over at least part of the ambient input region.

33. The system of claim 22, further comprising one or more additional optical elements positioned in the light guide between the proximal optical element and the distal optical element.

34. The system of claim 22, further comprising a network communicatively coupled to the computer.

35. The system of claim 34, further comprising one or more servers coupled to the network.

36. The system of claim 35 wherein the one or more servers can analyze images receive from the eye-measurement camera and can transmit information about the eye position to the computer.

37. The system of claim 22 wherein the one or more heads-up displays are mounted in a pair of eyeglass frames.

* * * * *